Patented Apr. 20, 1954

2,676,177

UNITED STATES PATENT OFFICE 2,676,177

PROCESS FOR THE PREPARATION OF OPTICALLY ACTIVE 3-METHOXY-N-METHYL MORPHINANS AND SALTS THEREOF

Otto Schnider and Andre Grüssner, Basel, Switzerland, assignors to Hoffmann-La Roche Inc., Nutley, N. J., a corporation of New Jersey No Drawing. Application October 27, 1950, Serial No. 192,599

Claims priority, application Switzerland November 9, 1949

13 Claims. (Cl. 260—285)

The invention relates to the manufacture of optically active 3-methoxy-N-methyl-morphinans starting from racemic 3-hydroxy-N-methyl-morphinan.

It has been found according to the invention that the D,L-3-hydroxy-N-methyl-morphinan may be subjected, in any desirable sequence, on the one hand to separation into the optical antipodes, and, on the other hand, to methylation at its hydroxy group.

Depending upon the (+)- or the (—)-3-methoxy-N-methyl-morphinan which it is desirable to prepare, the one or the other way should advantageously be followed. For the preparation of (—)-3-methoxy-N-methyl-morphinan or the salts thereof it is better first to separate D,L-3-hydroxy-N-methyl-morphinan by means of an optically active acid, suitably D-tartaric acid, into the antipodes, whereby (—)-3-hydroxy-N-methyl-morphinan tartrate will crystallize first from water; the (—)-base which can be obtained from the (—)-tartrate, for instance by treatment with sodium carbonate solution, may then be methylated by means of a methylating agent, such as phenyl-trimethyl-ammonium-hydroxide, and the (—)-3-methoxy-N-methyl-morphinan formed is converted, as the case may be, into the desired salts. The (+)-3-methoxy-N-methyl-morphinan and the salts thereof are prepared advantageously by first methylating D,L-3-hydroxy-N-methyl-morphinan with a methylating agent, such as phenyl-trimethyl-ammonium-hydroxide, and thereafter separating into the antipodes the D,L-3-methoxy-N-methyl-morphinan thus formed with an optically active acid, such as D-tartaric acid, whereby the (+)-3-methoxy-N-methyl-morphinan-tartrate cristallizes in alcohol as a difficulty soluble salt; the free base can be obtained from the tartrate, for instance by treatment with an aqueous sodium carbonate solution and the base may further be converted into the corresponding salts.

The novel compounds can be used as pharmaceuticals (more particularly as anti-pain and anti-cough agents).

Example 1

228 parts by weight of racemic 3-hydroxy-N-methyl-morphinan base are dissolved with 132 parts by weight of D-tartaric acid in 2600 parts by volume of water. The solution is filtered and, after having been seeded with the laevo rotatory D-tartaric salt, left standing for 24 hours at room temperature. The crystals formed are filtered, washed twice with 50 parts by volume each of ice water and dried; yield: 121 parts by weight.

The mother liquor is seeded with the dextro rotatory D-tartaric salt and stirred for 4–5 hours; the mass of crystals is filtered by suction and washed twice with 50 parts by volume each of ice water; yield: 102 parts by weight.

The mother liquor is concentrated in vacuo to 1500 parts by volume and seeded again with the laevo rotatory form. After 24 hours standing another 34 parts by weight of laevo rotatory D-tartaric salt of 3-hydroxy-N-methyl-morphinan are separated. This laevo rotatory D-tartaric salt crystallizes with 2 mols of water and melts at 113–116° C. $[\alpha]_D^{20} = -13.8°$ ($c=3$ in water). The base obtained therefrom, for instance by means of sodium carbonate, melts at 198–199° C. $[\alpha]_D^{20} = -56°$ ($c=3$ in alcohol). The hydrobromide of the base has a rotatory power of $[\alpha]_D^{20} = -27.5°$ ($c=3$ in water).

The dextro rotatory D-tartaric salt crystallizes as a monohydrate of melting points 183–185° C. $[\alpha]_D^{20} = +34.6°$ ($c=3$ in water). The base obtained therefrom, for instance by means of sodium carbonate solution, shows a melting point of 198–199° C. $[\alpha]_D^{20} = +56.3°$ ($c=3$ in alcohol) and its hydrobromide possesses a specific rotatory power of $[\alpha]_D^{20} = +27.5°$ ($c=3$ in water).

21.2 parts by weight of (—)-3-hydroxy-N-methyl-morphinan-tartrate are dissolved by heating in water, the solution is brought to a weak alkaline reaction by means of ammonia and the (—)-base is extracted therefrom with a 1:1 benzene/butanol mixture. After the solvents have been distilled off, the residue is taken into 400 parts by volume of toluene, whereupon 125 parts by volume of toluene are eliminated by distillation. To the dry solution obtained is added at 20° C. a methylating solution prepared as follows:

17.2 parts by weight of phenyl-trimethyl-ammonium-chloride are dissolved in 25 parts by volume of methanol; to this solution is added at 25° C. a solution of 2.25 parts by weight of sodium in 25 parts by volume of methanol; the sodium chloride formed is removed by filtration in absence of any moisture and any carbon anhydride.

The solution of the (—)-base and the methylating solution are heated while agitating, whereby first methanol, then a methanol/toluene mixture and finally toluene are distilled off. The reaction solution is cooled and washed with ice cold, dilute sodium hydroxide. From this toluene solution the (—)-3-methoxy-N-methyl-morphinan is isolated with dilute hydrobromic acid, whereupon it crystallizes as hydrobromide which melts at 124–126° C. $[\alpha]_D^{20}=-26.3°$ ($c=1.5$ in water).

The free base, which may be obtained from the hydrobromide according to usual methods, for instance by treatment with aqueous sodium carbonate solution, has a melting point of 108–111° C. and a rotatory power of $$[\alpha]_D^{20}=-49.3°$$

($c=3$ in absolute alcohol). The corresponding tartrate melts at 156–157° C. $[\alpha]_D^{20}=-11.6°$ ($c=1.5$ in water), whereas the melting point of the hydroiodide is 125–127° C. and of the methyliodide salt is 239–240° C.

In a similar manner the (+)-3-hydroxy-N-methyl-morphinan-tartrate may be converted into (+)-3-methoxy-N-methyl-morphinan and the salts thereof.

Example 2

The methylation of 51.4 parts by weight of D,L - 3 - hydroxy - N - methyl - morphinan with a methylating solution obtained from 51.5 parts by weight of phenyl - trimethyl - ammonium-chloride is carried into effect according to the procedure described in Example 1. The D,L-3-methoxy-N-methyl-morphinan is isolated in the form of its hydrobromide, which melts with 1 mol of water at 92–94° C., without water at 239–240° C. The base isolated from the aqueous solution by means of sodium carbonate melts at 81–83° C.

27.1 parts by weight of D,L-3-methoxy-N-methyl-morphinan base are dissolved with 15.0 parts by weight of D-tartaric acid in 150 parts by volume of hot alcohol. The solution is cooled and seeded with (+) - 3 - methoxy - N - methyl-morphinan-tartrate. The (+)-form which is difficultly soluble in alcohol separates, is filtered by suction and washed with a little alcohol. [The (—)-form may be crystallized from the residue obtained by concentrating the mother liquor, separating therefrom as much as possible of the (+)-form, and adding acetone.]

The (+) - 3 - methoxy - N - methyl - morphinan-tartrate melts with 1 mol of water at 195–196° C. $[\alpha]_D^{20}=+30.6°$ ($c=1.5$ in water). The (+)-base melting at 108–109° C. may be obtained from the tartrate by means of sodium carbonate. The corresponding hydrobromide melts at 122–124° C. $[\alpha]_D^{20}=+27.6°$ ($c=1.5$ in water).

We claim:
1. A process which comprises treating D,L-3-hydroxy-N-methyl-morphinan with an optically active acid to form a mixture of optically active salts and separating from said mixture a salt of (+)-3-hydroxy-N-methyl-morphinan with said acid.
2. A process according to claim 1 wherein the optically active acid is D-tartaric acid.
3. (+)-3-hydroxy-N-methyl-morphinan.
4. A compound selected from the group consisting of (+)-3-hydroxy-N-methyl-morphinan and its acid addition salts.
5. An acid addition salt of (+)-3-hydroxy-N-methyl-morphinan.
6. A tartaric acid addition salt of (+)-3-hydroxy-N-methyl-morphinan.
7. A compound selected from the group consisting of (+)-3-methoxy-N-methyl-morphinan and its acid addition salts.
8. (+)-3-methoxy-N-methyl-morphinan.
9. An acid addition salt of (+)-3-methoxy-N-methyl-morphinan.
10. A tartaric acid addition salt of (+)-3-methoxy-N-methyl-morphinan.
11. A process for the preparation of (+)-3-methoxy-N-methyl-morphinan which comprises subjecting an optically inactive form of 3-hydroxy-N-methyl-morphinan to resolution with an optically active acid to produce (+)-3-hydroxy-N-methyl-morphinan and treating the latter with phenyl-trimethyl-ammonium hydroxide to produce (+)-3-methoxy-N-methyl-morphinan.
12. A process for the preparation of (+)-3-methoxy-N-methyl-morphinan which comprises reacting (+) - 3 - hydroxy - N - methyl - morphinan with phenyl-trimethyl-ammonium hydroxide.
13. A hydrobromic acid addition salt of (+)-3-methoxy-N-methyl-morphinan.

References Cited in the file of this patent

UNITED STATES PATENTS

| Number | Name | Date |
| --- | --- | --- |
| 1,100,998 | Traub | June 23, 1914 |
| 2,524,856 | Schnider et al. | Oct. 10, 1950 |

OTHER REFERENCES

Houben, "Die Methoden der organischen Chemie," vol. II (Edwards Bros., Ann Arbor, Mich.; 1943), pp. 1076–1079.